United States Patent [19]

Taylor

[11] 4,015,883
[45] Apr. 5, 1977

[54] ANNULAR SEALING MEMBERS AND ASSEMBLIES INCORPORATING THEM

[75] Inventor: Geoffrey Taylor, Luton, England

[73] Assignee: SKF Industrial Trading and Development Company, B.V., Nieuwegein, Netherlands

[22] Filed: June 13, 1975

[21] Appl. No.: 586,652

Related U.S. Application Data

[63] Continuation of Ser. No. 408,894, Oct. 23, 1973, abandoned.

[52] U.S. Cl. .............................. 308/187.1; 277/153
[51] Int. Cl.² ..................... F16C 1/24; F16C 33/78
[58] Field of Search ............ 277/11, 153, 182, 179, 277/153; 308/187.1, 187.2

[56] References Cited

UNITED STATES PATENTS

| 2,830,858 | 4/1958 | Moorman et al. | 308/187.2 |
| 2,873,153 | 2/1959 | Haynie | 308/187.2 |
| 3,467,395 | 9/1969 | Kan | 308/187.1 |

Primary Examiner—Joseph F. Peters, Jr.
Assistant Examiner—Richard A. Bertsch
Attorney, Agent, or Firm—Daniel M. Rosen

[57] ABSTRACT

An annular sealing member one peripheral surface of which has a portion or portions bounded by a cylinder and a single enlarged diameter portion projecting radially beyond the cylinder, the sealing member having an annular sealing edge around its other peripheral surface or around one axial end face of the sealing member.

8 Claims, 3 Drawing Figures

ANNULAR SEALING MEMBERS AND ASSEMBLIES INCORPORATING THEM

This is a continuation of application Ser. No. 408,894, filed Oct. 23, 1973, now abandoned.

BACKGROUND AND SUMMARY OF THE INVENTION

This invention relates to annular sealing members and assemblies incorporating them.

The invention provides an annular sealing member one peripheral surface of which has a portion or portions bounded by a cylinder and a single enlarged diameter portion projecting radially beyond the cylinder, the sealing member having an annular sealing edge around its other peripheral surface or around one axial end face of the sealing member.

The invention also provides an assembly comprising two coaxial relatively rotatable parts, one of which has a cylindrical seating surface, and a resilient annular sealing member for sealing an annular gap between the parts, one peripheral surface of which sealing member has a single enlarged diameter portion which is an interference fit in or on the seating surface and the remainder of that peripheral surface is no more than a sliding fit in or on the seating surface, the sealing member also having an annular sealing edge around its other peripheral surface or one axial end face of the sealing member which edge seals with a co-operating surface on the other of the relatively rotatable parts.

In such assemblies, the enlarged diameter portion may be adjacent one end of the sealing member. If this feature is adopted the edge of the sealing member adjacent the enlarged diameter portion may be chamfered to provide a lead for inserting the sealing member into or onto the seating surface. The chamfer angle may be 25° to the horizontal.

Also in assemblies according to the invention, the sealing member may be provided with a reinforcing member extending into or embedded in the sealing member. Preferably, the radial thickness of resilient material of the sealing member covering the outer peripheral surface of the reinforcing member is at least 0.5 mm.

Furthermore, in assemblies according to the invention, said one peripheral surface of the sealing member may be the outer peripheral surface, the sealing edge connected to the body of the sealing member by an integral flexible web and the sealing edge constituting the inner periphery of the sealing member. In such arrangements, a garter spring may be provided around the sealing edge to bias the sealing edge radially inwards.

The two relatively rotatable parts in any of the above assemblies may be the inner race ring and the outer race ring respectively of a rolling bearing.

When the relatively rotatable parts are the inner and outer race rings of a rolling bearing, the seating surface may be provided by a cylindrical recess in the respective race ring which recess extends axially towards the rolling members from one end face of that race ring.

If the latter feature is adopted, the axial length of the sealing ring may be greater than the axial extent of the recess so that a portion of the sealing member spaced axially from the enlarged diameter portion thereof projects axially beyond the said one end face of the race ring, the reinforcing member (if any) being radially inwardly of the said projecting portion or being contained between the axial ends of the recess and spaced from the open end thereof so that axial compression of the projecting part of the sealing member is not osbtructed by the reinforcing member.

It will be appreciated that when the race ring in which the recess is provided, is located in a housing, the projecting portion of the sealing member is intended to be compressed against an end wall of the housing or an adjacent component to effect a seal thereagainst.

Some embodiments of the invention will now be described by way of example and with reference to the accompanying drawings.

DETAILED DESCRIPTION OF THE PREFERRED EMBODIMENT

Figure 1:
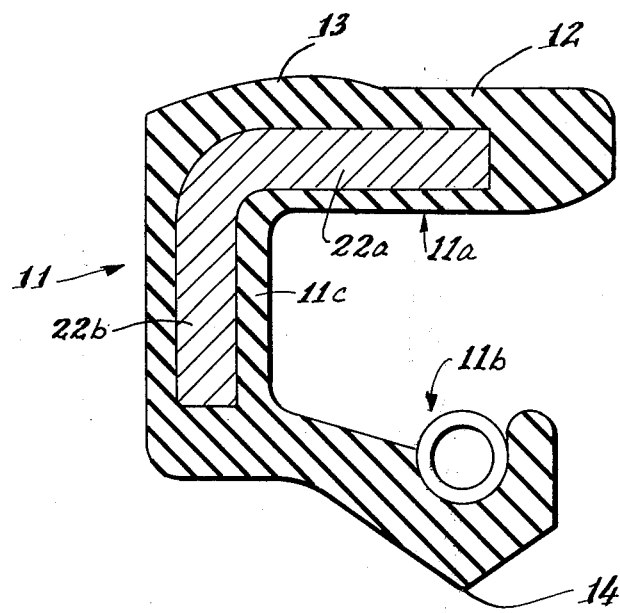
FIG. 1 shows a detail of a sealing member embodying the invention, in its unmounted state.

Referring to FIG. 1, there is shown an annular rubber sealing member 11 the outer peripheral surface of which has a cylindrical portion 12 and an enlarged diameter portion 13 projecting radially beyond the cylindrical portion 12. The sealing member 11 has an annular sealing edge 14 around its inner periphery.

Figure 2:
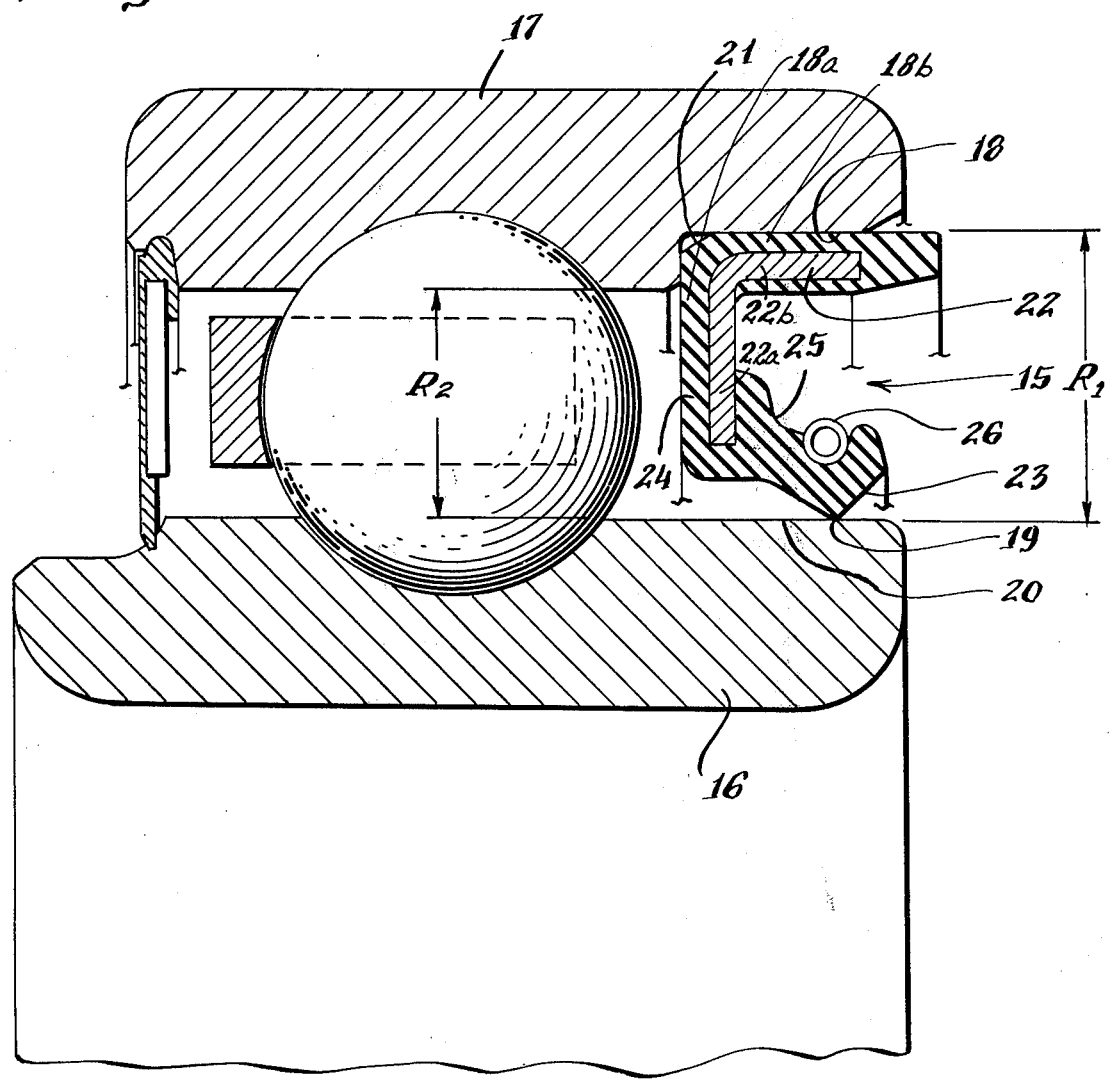
FIG. 2 shows a cross-section of the upper half of an assembly incorporating another sealing member embodying the invention.

FIG. 2 shows a sealing member 15 of the type shown in FIG. 1. which is a generally U-shaped body having first and second, or inner and outer legs connected by a stem part. The sealing member 15 is located to seal the annular gap between the outer wall surface of the inner race ring 16 and the inner wall surface of the outer race ring 17 of a ball bearing. The outer peripheral surface of the sealing member 15 has an enlarged diameter portion adjacent its left hand end, which is an interference fit in a cylindrical recess 18 in the inner surface of the outer race ring 17, this recess forming a notch having axial shoulder 18a and a radial surface 18b. The gap at the end of the assembly has first radial length $R_1$, while the gap inward from the end defined by said shoulder 18a has smaller radial length $R_2$. The remainder of the outer peripheral surface of the sealing member 15 is cylindrical and has a diameter which is slightly less than the nominal diameter of the recess 18.

The sealing member 15 has an annular sealing edge 19 around its inner periphery which seals with a cylindrical extension 20 of the external surface of the inner race ring 16. Said sealing member could be described alternatively as comprising a flexible, resilient body part and a less flexible reinforcement part, the body part comprising coaxial outer and inner ring parts 11a, 11b, having adjacent ends which are jointed by a washer part 11c; the reinforcement part 22 comprises a ring part 22a embedded in the ring part 11a of the body part, and a washer part 22b embedded in the washer part 11c of the body part. In axial section view of the bearing assembly, this sealing means defines a C-shaped element, only one being shown in FIG. 2, wherein the open side of the C faces axially outward; the reinforcing part defines an L-shaped element embedded in said C-shaped elements, only one being shown in FIG. 2.

The external edge of the sealing member 15 at its left hand or inward end is chamfered as indicated at 21 to provide a lead for inserting the sealing member 15 into the recess 18 and it has been found that a chamfer angle of 25° is suitable for most applications of the seal. The sealing member is provide with an annular reinforcing element 22 which is L-shaped in cross section, having first and second limbs 22a, 22b corresponding respectively to the stem and second leg of said U-shape of the resilient body. We have found that in order to achieve the most effective functioning of the enlarged diameter external portion, the radial thickness of rubber covering the outer peripheral surface of the cylindrical portion of the element 22 should be at least 0.5 mm.

The sealing edge 19 is provided around the inner periphery of a sealing head 23. The sealing head is connected to the body 24 of the sealing member by an integral flexible web 25 which is frusto-conical when unstrained and is joined to the body 24 at its large diameter end. A garter spring resilient member 26 is located in a peripheral groove in the outer surface of the sealing head 23 to bias the sealing edge 23 radially inwardly.

The axial length of the second leg portion of sealing member 15 located in the recess 18 is greater than the axial extent of the recess 18 so that a portion of rubber projects axially beyond the right hand end face of the outer race ring 17. The reinforcing member 22 is contained within and spaced from the right hand end of the recess 18 so that axial compression of the projecting portion of rubber is not obstructed as seen the radial length of limb 22a is less than the radial length $R_2$ of the gap. When the outer race ring is located in a housing, the projecting portion of rubber is compressed against an end wall of the housing or against an adjacent component to effect a seal thereagainst to inhibit the escape of lubricant between the outer peripheral surface of the sealing member 15 and the annular surface of the recess 18.

It will be appreciated that the required location of the sealing member 15 in the recess 18 is effected by the interference between a relatively narrow peripheral portion of the sealing member as compared with conventional annular sealing members and the recess so that the risk of distorting the outer race ring by insertion of the sealing member is reduced.

Figure 3:
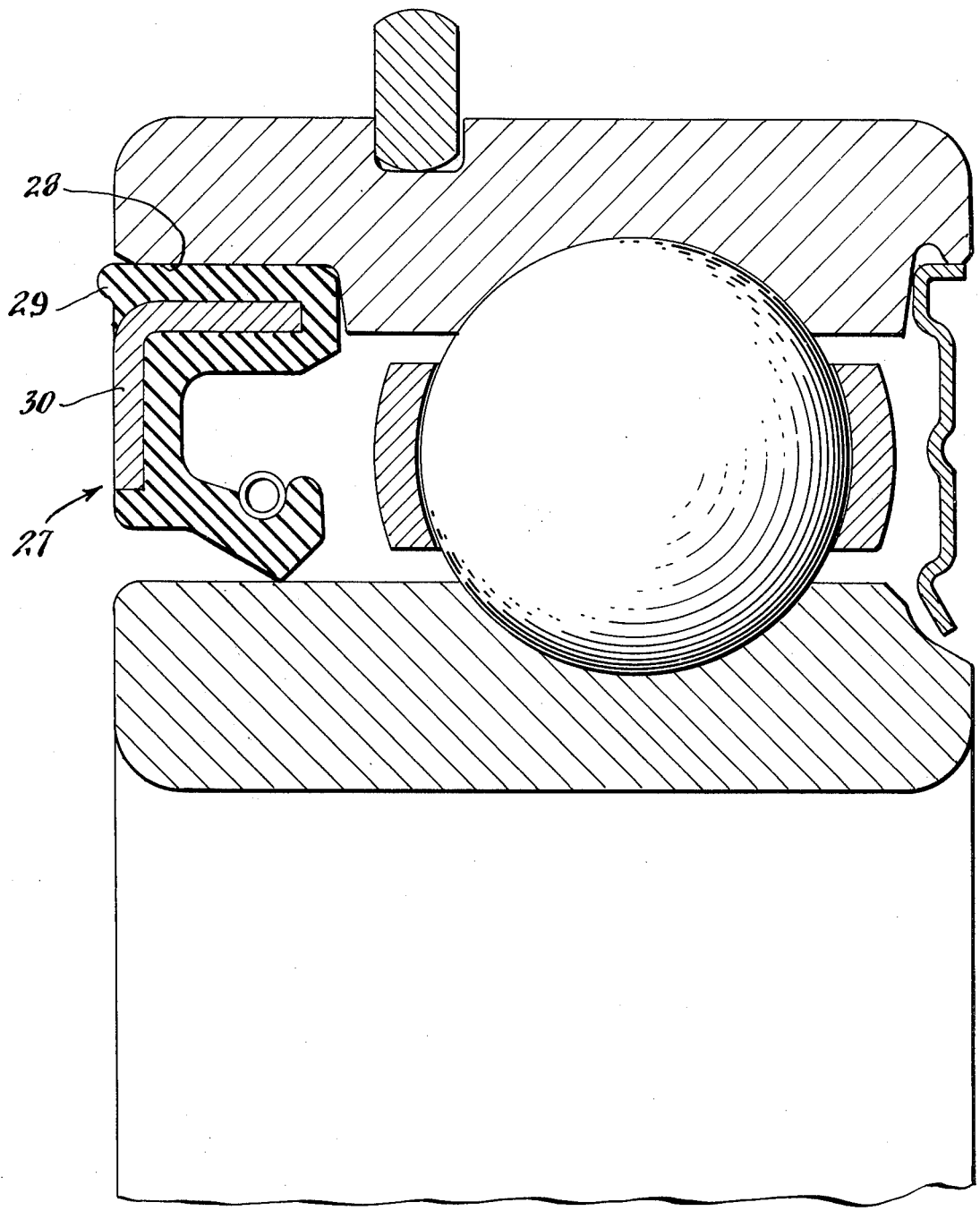
FIG. 3 shows a cross-section of the upper half of an assembly incorporating a further sealing member embodying the invention.

FIG. 3 shows another sealing member 27 according to the invention located between the inner and outer race rings of a rolling bearing. The sealing member in this construction has, when in its unmounted condition, a peripheral protuberance adjacent the right hand end of its outer peripheral surface since that end is inserted first into the cylindrical recess 28 in the outer race ring. The sealing member 27 is also provided with an annular resilient bead 29 around its left hand end face which, when free, projects beyond the left hand end face of the outer race ring. When the outer race ring is assembled in a housing, the bead 29 is compressed against an adjacent surface to provide a seal in a similar manner to that described above in connection with the projecting rubber portion of the sealing member of FIG. 2. The outer periphery of the reinforcing member 30 is spaced radially inwardly of the bead 29 so that it does not obstruct axial compression of the bead 29.

Many modifications of the above described embodiments are possible within the scope of the invention. For example the form of the outer peripheral surface of the sealing body described above can also be used with face seals for sealing against radial surfaces. Furthermore the seal lip of the sealing members may bear directly on a shaft rather than on an extension of the inner race ring.

Seals according to the invention are particularly applicable for preventing the escape of lubricant from an enclosed chamber at a location where a freely rotatable shaft supported in bearings passes through a wall of the chamber. The seals also prevent dirt and other extraneous substances from entering the chamber.

I claim:

1. In a bearing assembly including coaxial inner and outer race rings defining between them an annular gap having a central part and a first end part, a plurality of captive rolling elements in said central part of the gap and seal means closing said first end part of the gap, the improvement in combination therewith, wherein said outer race ring defines a bore having axially adjacent first and second surfaces of first diameter and smaller second diameter respectively, with a shoulder surface extending transversely of the assembly axis between said first and second surfaces, and said inner race ring has a third surface on its outer circumference which is spaced from and defines with said first surface said end part of said gap, and said seal means comprises an annular body part of flexible, resilient material formed of outer and inner rings and a web connecting said seal means rings which, with said web, define in axial section, a C-shape having outer and inner circumferential seal surfaces respectively for sealingly contacting said first and third surfaces of said outer and inner race rings and said web has an axial surface for sealingly contacting said shoulder of said outer race ring, said seal means further comprising a reinforcing part of less flexible material than said body part material, said reinforcing part defining in axial section an L-shape and comprising a ring part embedded in said seal means outer ring and web at least partially embedded in the web of said seal means body part, said seal means outer seal surface, when in free state having an outer diameter slightly greater than said inner diameter of said outer ring first seal surface, and said seal means outer seal surface, when situated in and closing said first end part of said gap, being radially compressed in an interference fit.

2. A bearing assembly according to claim 1, wherein said outer ring part of the seal means comprises a layer of at least 0.5 mm thickness of resilient material on the ring part of said reinforcing part.

3. A bearing assembly according to claim 1, wherein said web of the body part of the seal means has greater radial length between said outer and inner rings thereof than the radial length of the web of said reinforcing part, with a remaining portion of the body part comprising a web that is more flexible than the web of the seal means body part in which the reinforcing part is embedded.

4. A bearing assembly according to claim 1, wherein said seal means further comprises an annular spring means engaging and urging said inner ring of the seal means radially inward against said inner race-ring.

5. A bearing assembly according to claim 1, wherein said seal means is oriented such that the open side of said C-shaped element faces axially outward.

6. A bearing assembly according to claim 1, wherein said seal means is oriented such that the open side of said C-shaped element faces axially inward.

7. In a bearing assembly including coaxial outer and inner race rings defining between them an annular gap having a central part which contains a plurality of captive rolling elements and an end part, and seal means closing said end part, said outer race ring having a bore defining a first seal surface, and said inner race ring having an outer surface defining a second seal surface, with said fist and second seal surfaces defining between them said end part of said gap, the improvement in combination therewith, wherein said seal means comprises an annular body of flexible, resilient material and an annular reinforcing part of less flexible material, said seal means comprising an outer ring having first and second end parts and an intermediate part, said first end part of the seal means having outer diameter slightly less than that of said first seal surface said intermediate part having outer seal surface diameter slightly greater than that of said first seal surface and said second end part tapering from said intermediate part diameter to an end diameter substantially less than said first seal surface diameter and thus formed as a chamfered lead part, said seal means further comprising an inner ring having first and second ends corresponding to those of said outer ring of the seal means and positioned coaxial and radially inward thereof and adjacent said outer ring of the seal means, and a web connecting said second end parts of said outer and inner rings of the seal means, said reinforcing part comprising a ring part embedded in said seal means outer ring, and a web part at least partially embedded in said seal means web, said seal means inner ring having a radially inward extending seal surface for sealingly engaging said second seal surface of said inner race ring, said seal means intermediate part seal surface, when situated in and closing said first end part of said gap, being radially compressed in an interference fit.

8. A bearing assembly according to claim 7, wherein said taper angle is approximately 25° relative to said circumferential surface of the outer race ring.

* * * * *

UNITED STATES PATENT AND TRADEMARK OFFICE
CERTIFICATE OF CORRECTION

PATENT NO. : 4,015,883
DATED : April 5, 1977
INVENTOR(S) : Geoffrey Taylor

It is certified that error appears in the above–identified patent and that said Letters Patent are hereby corrected as shown below:

Column 2, line 58, change "jointed" to --joined--.

Column 3, line 4, after "18" insert --,--.

Column 3, line 6, change "provide" to --provided--.

Column 5, line 8, change "fist" to --first--.

Column 5, line 16, after "surface" insert --,--.

Column 5, line 18, after "surface" insert --,--.

Signed and Sealed this nineteenth Day of July 1977

[SEAL]

Attest:

RUTH C. MASON
Attesting Officer

C. MARSHALL DANN
Commissioner of Patents and Trademarks